United States Patent [19]

Nakamura

[11] Patent Number: 4,578,317
[45] Date of Patent: Mar. 25, 1986

[54] JOURNAL

[75] Inventor: Keiji Nakamura, Misato, Japan

[73] Assignee: Nippon Piston Ring Co., Ltd., Tokyo, Japan

[21] Appl. No.: 504,729

[22] Filed: Jun. 16, 1983

[30] Foreign Application Priority Data

Jun. 17, 1982 [JP] Japan .............................. 57-89574[U]

[51] Int. Cl.⁴ .............................. B22F 7/00; B22F 3/00
[52] U.S. Cl. ..................................... 428/547; 428/548; 419/8
[58] Field of Search .................. 384/279, 280; 419/23; 428/546, 547, 548, 550

[56] References Cited

U.S. PATENT DOCUMENTS

| | | | |
|---|---|---|---|
| 2,704,234 | 3/1955 | Love et al. ........................... | 384/280 |
| 2,821,010 | 1/1958 | Vasconi et al. ...................... | 384/280 |
| 3,119,640 | 1/1964 | Laudig ................................. | 384/279 |
| 4,090,873 | 5/1978 | Takamura et al. ..................... | 419/8 |
| 4,137,106 | 1/1979 | Doi et al. ............................. | 419/8 |
| 4,236,923 | 12/1980 | Takahashi et al. ................. | 75/208 R |
| 4,386,959 | 6/1983 | Frehn ..................................... | 419/8 |

FOREIGN PATENT DOCUMENTS 3007008 8/1980 Fed. Rep. of Germany ...... 428/548

*Primary Examiner*—Richard D. Lovering
*Assistant Examiner*—T. J. Wallen
*Attorney, Agent, or Firm*—Birch, Stewart, Kolasch & Birch

[57] ABSTRACT

A journal assembled to a rotary shaft has its outer portion made of solid phase sintered alloy having 10% to 30% by volume of sintering pores inpregnated with lubricating oil and its inner portion is made of a liquid phase sintered alloy being sinterable at the same temperature as the solid phase sintered alloy. The outer portion is wear-resistant and well lubricable due to the oil impregnated therein. The inner portion is tightly secured to both the outer portion and the rotary shaft because the liquid phase sintered alloy is metallurgically diffusion-bonded to both the solid phase sintered alloy and the rotary shaft.

6 Claims, 9 Drawing Figures

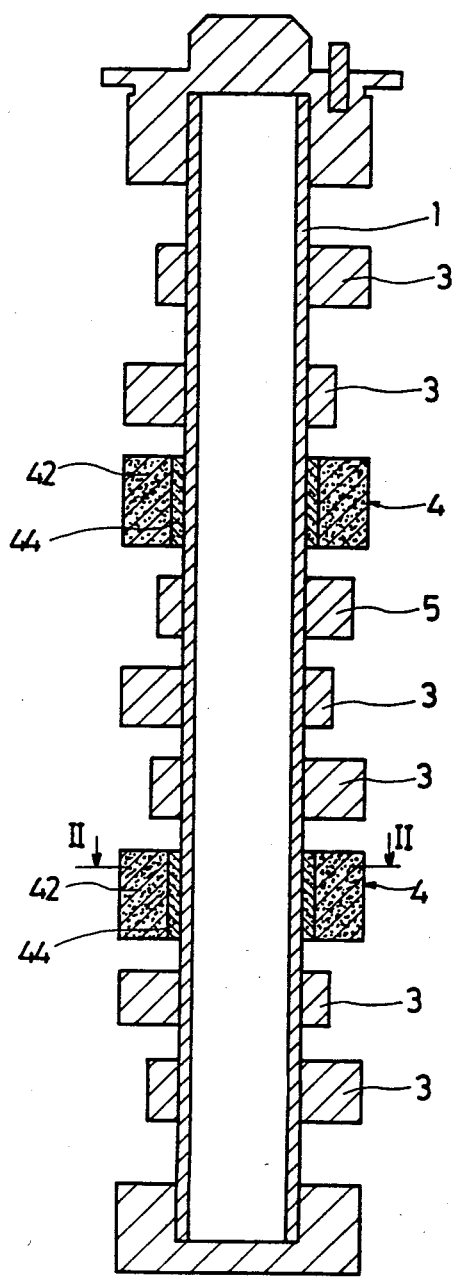
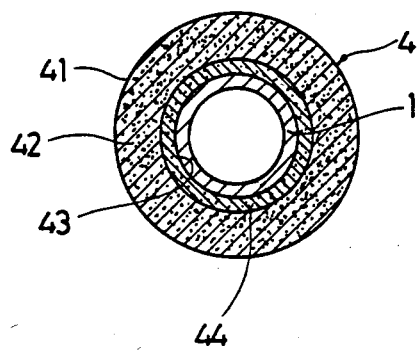
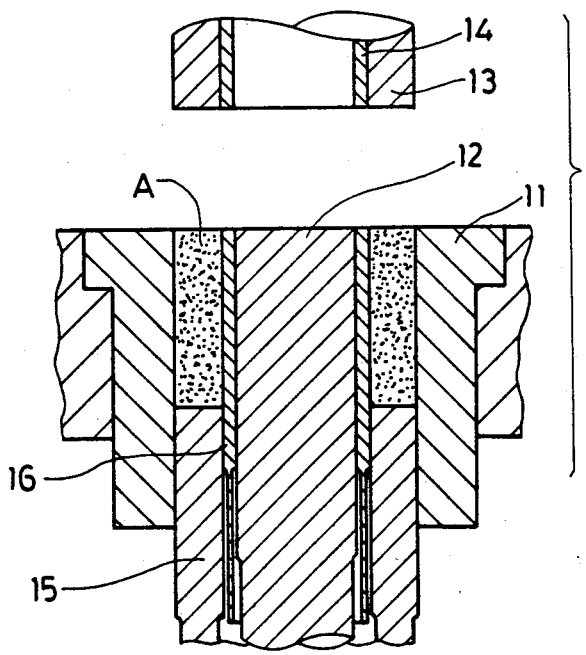

4,578,317

JOURNAL

BACKGROUND OF THE INVENTION

The present invention relates to a journal made of sintered alloy and assembled to a rotary shaft for frictional engagement with a journal bearing to support the rotary shaft.

The journals are secured to a shaft loaded with many members and frictionally supported by respective journal bearings. Thus the journals are required to be highly wear-resistant and well lubricated. Accordingly journals are made of a sintered alloy which is superior in wear-resistance and lubricating ability.

Journals of sintered alloys have conventionally been secured to a rotary shaft of cast iron or steel pipe by means of screws. Brazing and welding are unavailable for joining journals made of sintered alloys with a rotary shaft. The reason for this is that joining by brazing is not durable under severe working conditions and welding can not prevent the porous sintered alloy from developing excessive blow holes and cracks.

It has been proposed to make journals of a shrinkable sintered alloy or a liquid phase sintered alloy which can be metallurgically bonded on a shaft due to diffusion. However, a shrinkable or liquid phase sintered alloy is not very porous or oily, and therefore is not suitable for use as a slidable part subjected to a relatively high plane pressure. The known journals made of a sintered alloy is composed of a pair of semicircular parts which are mounted on a rotary shaft and fastened together by screws, thus the expensive machining and assembling cannot be eliminated.

SUMMARY OF THE INVENTION

It is an object of the present invention to provide a more effective journal made of a sintered alloy.

It is another object of the present invention to provide a journal of sintered alloy which is superior in wear-resistance and lubricating ability.

Other objects of the present invention will become apparent from the following detailed description of the invention in connection with the attached drawings.

BRIEF DESCRIPTION OF THE ATTACHED DRAWINGS

FIG. 1 is a longitudinal section of a camshaft provided with the journal of the invention;

FIG. 2 is a cross-section taken along the line II—II in FIG. 1;

FIGS. 3 to 7 are side sections showing the successive steps in which a preform is molded.

DETAILED DESCRIPTION

Figure 4:
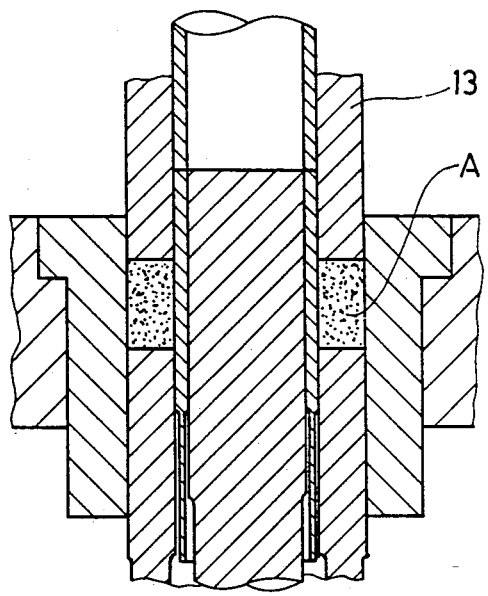

The present invention provides a journal characterized by the fact that the outer portion which forms a sliding surface is made of a porous solid phase sintered alloy, and the inner portion which is secured to a shaft is made of liquid phase sintered alloy which is sinterable at the same temperature as the solid phase sintered alloy. The liquid phase sintered alloy causes a diffusion of the liquid phase and metallurgically bonds to both the outer portion of the solid phase sintered alloy and the rotary shaft.

As seen in FIG. 1, a camshaft has a rotary shaft 1 of steel pipe on which cam lobes 3, journals 4, a gear 5, and end parts are mounted. The cam lobes 3 made of liquid sintered alloy are superior in resistance to plane pressure and hardness and are firmly secured to the shaft 1. The journals 4 consist of inner and outer portions individually made of different sintered alloys 42, 44.

As seen in FIG. 2, the journal 4 is a composite sintered compact consisting of its outer portion 41 made of solid sintered 42 alloy and its inner portion 43 made of liquid phase sintered alloy 44. The outer portion 41 of solid sintered alloy 42 is usually porous to contain 10% to 30% by volume of sintering pores in which lubricating oil is contained. As the solid phase sintered alloy, the composition of a Fe-C or an Fe-Cu-C system with a pearlite matrix and containing a self-lubricating addition are preferably used to improve the journal in wear-resistance and hardness as a slidable member. The self-lubricating addition contains at least one of MoS, Pb, and Sn that are not solid-solved in the matrix. The journal 4 has the inner portion thereof 43 made of a liquid phase sintered alloy 44, which yields a liquid phase and simultaneously causes alloying elements to diffuse into the shaft 1 and the outer portion 41 of solid sintered alloy 42 when sinterred at the same temperature as the solid sintered alloy 42, resulting in the fact that the liquid phase sintered alloy 44 is metallurgically bonded both with the shaft 1 and with the outer portion 41. An iron base sintered alloy can be employed as the liquid phase sintered alloy. It preferably contains P, B, and Si which reduces the liquid phase yielding temperature and/or Cr, Co, Ni and are the like which are easy to diffuse and effective in increasing the binding strength.

The journal of the present invention is manufactured as follows:

The molding machine has a die 11, a core rod 12, outer and inner upper punches 13, 14 and outer and inner lower punches 15, 16 as seen in FIG. 3. Powder A of solid phase sintered alloy is filled up in a cavity formed when the outer lower punch 15 is relatively lowered.

Thereafter, as seen in FIG. 4, the outer upper punch 13 is lowered to compress the powder into an outer green compact A.

Figure 5:
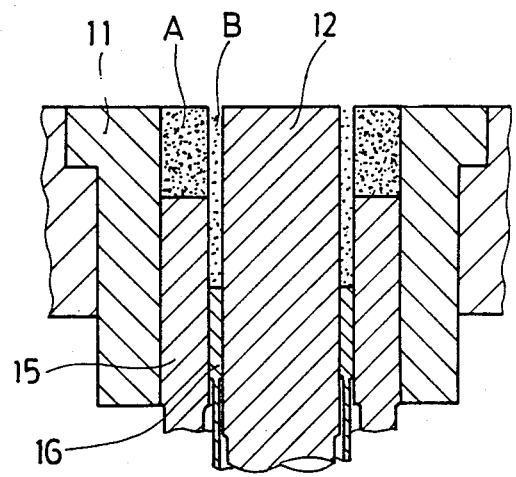

After the outer green compact A is raised by the outer lower punch 15 to have its upper surface at the same level as the upper surface of the die 11, the inner lower punch 16 is lowered to form a cavity in which powder B of the liquid phase sintered alloy is filled up, as seen in FIG. 5.

Figure 6:
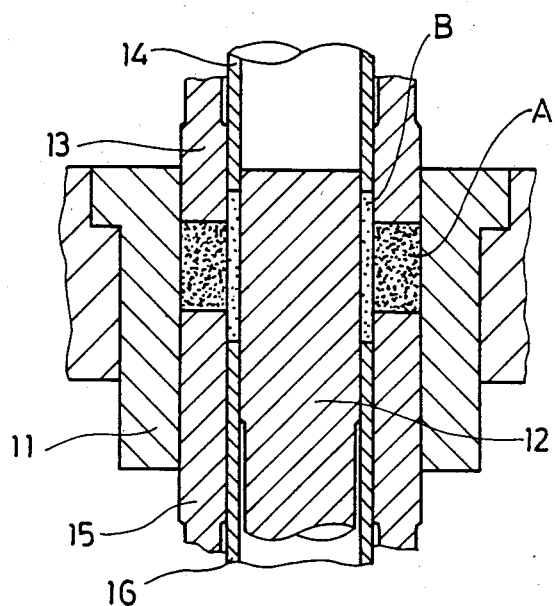
Figure 7:
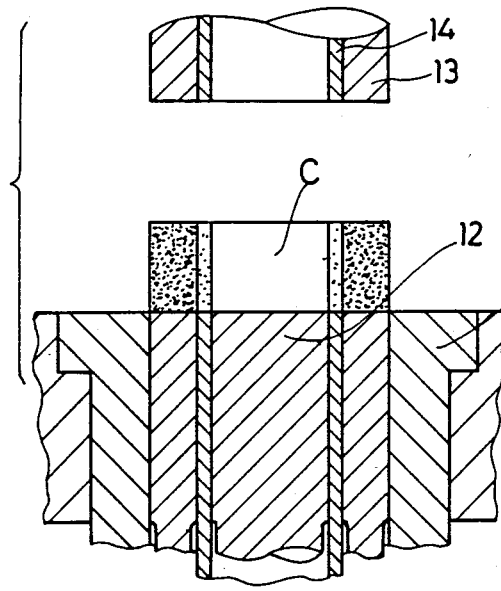

As seen in FIG. 6, while the outer and inner punches 13, 14 are lowered, the die 11, the core rod 12 and inner lower punch 16 are raised to compress the powder B to an inner green compact B. Meantime, the outer green compact A lowers with the outer lower punch 15. After the outer and inner upper punches 13, 14 are raised, the die 11 and the core rod 12 are lowered with the result that a composite preform C thus composed is ready to be taken out of the die 11, as seen in FIG. 7.

The composite preform C is preliminarily sintered at a temperature not yielding a liquid phase, so that it is strong enough to be assembled to the rotary shaft without causing cracks during assembling. The preform C is assembled to the rotary shaft together with other members such as cam lobes and gears. The assembly is sintered at a temperature in a range of 1100° C. to 1200° C., in the case of the iron base solid and liquid phase sintered alloys.

The journal of the invention has its outer portion composed of a solid phase sintered alloy which is so porous as to act as a reservoir for lubricating oil, and its inner portion composed of a liquid phase sintered alloy which bonds both to the rotary shaft and to the outer portion of the solid phase sintered alloy due to diffusion. Thus the journal of the present invention is superior in oil-impregnation and wear-resistance, as a slidable member. The journal is sintered and assembled to the rotary shaft at the same time, needing no expensive machining and assembling operations with the result that it is less costly and more productive.

As shown in FIGS. 3 to 7, the preform is usually composed of inner and outer portions. However, the outer green compact of solid phase sintered alloy may previously be pre-sintered and then fitted on the inner green compact to shape the preform before the preform is assembled to and sintered with the rotary shaft.

Figure 8:
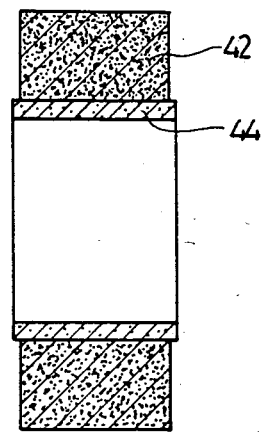
FIGS. 8 and 9 are longitudinal sections of different embodiments of the present invention.

As seen in FIG. 8, if the inner green compact of liquid phase sintered alloy is more shrinkable than the outer green compact of solid phase sintered alloy, the former is shaped longer than the latter to equalize both compacts in their length after sintering.

Figure 9:
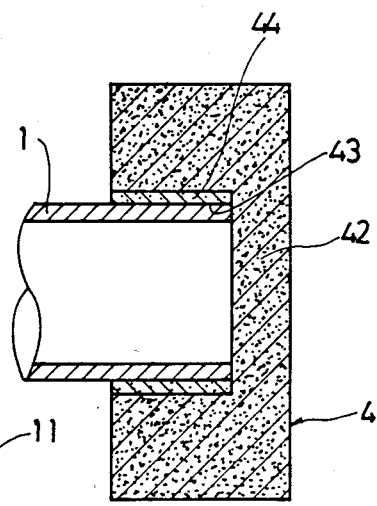

As seen in FIG. 9, the journal 4 of the invention is also used as an end part of the rotary shaft 1. The end journal 4 covers the shaft end with its inner portion 43 being made of the liquid phase sintered alloy 44. Such an end part is very advantageous in oil-impregnation, binding strength and productivity.

What is claimed is:

1. A composite structure comprising a journal and a rotary shaft, said journal being made of a sintered alloy and assembled to said rotary shaft, said journal comprising an outer portion thereof made of a porous solid phase sintered alloy and used for sliding engagement with a journal bearing and the inner portion thereof made of a liquid phase sintered alloy secured to said rotary shaft, said liquid phase sintered alloy being sinterable at the same temperature as said solid phase sintered alloy to be metallurgically diffusion-bonded to both the solid phase alloy and the rotary shaft.

2. The journal as claimed in claim 1, wherein said solid sintered alloy has 10% to 30% by volume of sintering pores.

3. The journal as claimed in claim 1, wherein said solid phase sintered alloy comprises a composition selected from the group consisting of a Fe-C system with a pearlite matrix, a Fe-Cu-C system with a pearlite matrix, and mixtures thereof.

4. The journal as claimed in claim 3, wherein said composition includes an additive containing at least one substance selected from the group consisting of MoS, Pb, and Sn.

5. The journal as claimed in claim 1, wherein said liquid phase sintered alloy comprises a composition of an iron base sintered alloy containing at least one element selected from the group consisting of P, B, and Si.

6. The journal as claimed in claim 5, wherein said iron base sintered alloy contains at least one metal selected from the group consisting of Cr, Co, and Ni.

* * * * *